United States Patent
Bhargava et al.

(10) Patent No.: US 9,594,881 B2
(45) Date of Patent: Mar. 14, 2017

(54) SYSTEM AND METHOD FOR PASSIVE THREAT DETECTION USING VIRTUAL MEMORY INSPECTION

(75) Inventors: Rishi Bhargava, Cupertino, CA (US); David P. Reese, Jr., Sunnyvale, CA (US)

(73) Assignee: McAfee, Inc., Santa Clara, CA (US)

(*) Notice: Subject to any disclaimer, the term of this patent is extended or adjusted under 35 U.S.C. 154(b) by 725 days.

(21) Appl. No.: 13/229,502

(22) Filed: Sep. 9, 2011
(Under 37 CFR 1.47)

(65) Prior Publication Data
US 2013/0246685 A1    Sep. 19, 2013

(51) Int. Cl.
| | | |
|---|---|---|
| *G06F 21/60* | (2013.01) | |
| *G06F 21/00* | (2013.01) | |
| *G06F 21/57* | (2013.01) | |
| *G06F 21/56* | (2013.01) | |
| *G06F 12/08* | (2016.01) | |

(52) U.S. Cl.
CPC ............ *G06F 21/00* (2013.01); *G06F 21/577* (2013.01); *G06F 12/08* (2013.01); *G06F 2212/1052* (2013.01); *G06F 2212/151* (2013.01)

(58) Field of Classification Search
CPC .......... G06F 21/56; G06F 21/60; G06F 21/55; G06F 21/566; G06F 21/554; G06F 21/606
USPC ...................................................... 726/22–26
See application file for complete search history.

(56) References Cited

U.S. PATENT DOCUMENTS

| | | |
|---|---|---|
| 4,688,169 A | 8/1987 | Joshi |
| 4,982,430 A | 1/1991 | Frezza et al. |
| 5,155,847 A | 10/1992 | Kirouac et al. |
| (Continued) | | |

FOREIGN PATENT DOCUMENTS

| | | |
|---|---|---|
| CN | 1383295 A | 12/2002 |
| CN | 101147379 | 3/2008 |
| (Continued) | | |

OTHER PUBLICATIONS

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

(Continued)

*Primary Examiner* — Tae Kim
*Assistant Examiner* — Shiuh-Huei Ku
(74) *Attorney, Agent, or Firm* — Patent Capital Group

(57) ABSTRACT

A method in one example implementation includes synchronizing a first memory page set with a second memory page set of a virtual guest machine, inspecting the first memory page set off-line, and detecting a threat in the first memory page set. The method further includes taking an action based on the threat. In more specific embodiments, the method includes updating the first memory page set with a subset of the second memory page set at an expiration of a synchronization interval, where the subset of the second memory page set was modified during the synchronization interval. In other more specific embodiments, the second memory page set of the virtual guest machine represents non-persistent memory of the virtual guest machine. In yet other specific embodiments, the action includes at least one of (Continued)

shutting down the virtual guest machine and alerting an administrator.

20 Claims, 3 Drawing Sheets

(56) References Cited

U.S. PATENT DOCUMENTS

| | | |
|---|---|---|
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,873,086 A | 2/1999 | Fujii et al. |
| 5,884,298 A | 3/1999 | Smith, II et al. |
| 5,907,709 A | 5/1999 | Cantey et al. |
| 5,907,860 A | 5/1999 | Garibay et al. |
| 5,926,832 A | 7/1999 | Wing et al. |
| 5,944,839 A | 8/1999 | Isenberg |
| 5,974,149 A | 10/1999 | Leppek |
| 5,987,557 A | 11/1999 | Ebrahim |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,182,142 B1 | 1/2001 | Win et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,377,808 B1 | 4/2002 | Korneluk et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,496,477 B1 | 12/2002 | Perkins et al. |
| 6,587,877 B1 | 7/2003 | Douglis et al. |
| 6,611,925 B1 | 8/2003 | Spear |
| 6,658,645 B1 | 12/2003 | Akuta et al. |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,941,470 B1 | 9/2005 | Jooste |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,054,930 B1 | 5/2006 | Cheriton |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,096,500 B2 | 8/2006 | Roberts et al. |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,340,684 B2 | 3/2008 | Ramamoorthy et al. |
| 7,346,781 B2 | 3/2008 | Cowie et al. |
| 7,349,931 B2 | 3/2008 | Horne |
| 7,350,204 B2 | 3/2008 | Lambert et al. |
| 7,353,501 B2 | 4/2008 | Tang et al. |
| 7,360,097 B2 | 4/2008 | Rothstein |
| 7,363,022 B2 | 4/2008 | Whelan et al. |
| 7,370,360 B2 | 5/2008 | van der Made |
| 7,385,938 B1 | 6/2008 | Beckett et al. |
| 7,406,517 B2 | 7/2008 | Hunt et al. |
| 7,441,265 B2 | 10/2008 | Staamann et al. |
| 7,463,590 B2 | 12/2008 | Mualem et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,632 B2 | 3/2010 | Vayman |
| 7,685,635 B2 | 3/2010 | Vega et al. |
| 7,694,150 B1 | 4/2010 | Kirby |
| 7,698,744 B2 | 4/2010 | Fanton et al. |
| 7,703,090 B2 | 4/2010 | Napier et al. |
| 7,739,497 B1 | 6/2010 | Fink et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,814,554 B1 | 10/2010 | Ragner |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,853,643 B1 | 12/2010 | Martinez et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,925,722 B1 | 4/2011 | Reed et al. |
| 7,937,455 B2 | 5/2011 | Saha et al. |
| 7,950,056 B1 | 5/2011 | Satish et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,055,904 B1 | 11/2011 | Cato et al. |
| 8,136,143 B2 | 3/2012 | Hannel et al. |
| 8,166,474 B1 | 4/2012 | Delco et al. |
| 8,195,931 B1 | 6/2012 | Sharma et al. |
| 8,205,188 B2 | 6/2012 | Ramamoorthy et al. |
| 8,209,680 B1 | 6/2012 | Le et al. |
| 8,234,709 B2 | 7/2012 | Viljoen et al. |
| 8,234,713 B1 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,352,930 B1 | 1/2013 | Sebes et al. |
| 8,381,284 B2 | 2/2013 | Dang et al. |
| 8,387,046 B1* | 2/2013 | Montague et al. ............ 718/1 |
| 8,515,075 B1 | 8/2013 | Saraf et al. |

(56) References Cited

U.S. PATENT DOCUMENTS

| | | |
|---|---|---|
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 8,584,199 B1 | 11/2013 | Chen et al. |
| 8,701,182 B2 | 4/2014 | Bhargava et al. |
| 8,707,422 B2 | 4/2014 | Bhargava et al. |
| 8,707,446 B2 | 4/2014 | Roy-Chowdhury et al. |
| 8,713,668 B2 | 4/2014 | Cooper et al. |
| 8,726,391 B1 | 5/2014 | Zhong et al. |
| 8,739,272 B1 | 5/2014 | Cooper et al. |
| 8,762,928 B2 | 6/2014 | Sharma et al. |
| 8,763,118 B2 | 6/2014 | Sebes et al. |
| 8,793,489 B2 | 7/2014 | Polunin et al. |
| 8,800,024 B2 | 8/2014 | Cooper et al. |
| 8,843,903 B1 | 9/2014 | Blaser et al. |
| 8,869,265 B2 | 10/2014 | Dang et al. |
| 8,875,292 B1 | 10/2014 | Bogorad et al. |
| 8,904,520 B1 | 12/2014 | Nachenberg et al. |
| 8,925,101 B2 | 12/2014 | Bhargava et al. |
| 8,938,800 B2 | 1/2015 | Bhargava et al. |
| 8,973,146 B2 | 3/2015 | Ramanan et al. |
| 9,112,830 B2 | 8/2015 | Cooper et al. |
| 9,134,998 B2 | 9/2015 | Roy-Chowdhury et al. |
| 9,356,909 B2 | 5/2016 | Cooper et al. |
| 9,413,785 B2 | 8/2016 | Cooper et al. |
| 9,424,154 B2 | 8/2016 | Bhargava et al. |
| 9,467,470 B2 | 10/2016 | Bhargava et al. |
| 2002/0056076 A1 | 5/2002 | Made |
| 2002/0069367 A1 | 6/2002 | Tindal et al. |
| 2002/0083175 A1 | 6/2002 | Afek et al. |
| 2002/0099671 A1 | 7/2002 | Mastin et al. |
| 2002/0114319 A1 | 8/2002 | Liu et al. |
| 2002/0118644 A1 | 8/2002 | Moir |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0061506 A1 | 3/2003 | Cooper et al. |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0088680 A1 | 5/2003 | Nachenberg et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Lyman Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0057454 A1 | 3/2004 | Hennegan et al. |
| 2004/0088398 A1 | 5/2004 | Barlow |
| 2004/0139206 A1 | 7/2004 | Claudatos et al. |
| 2004/0143749 A1 | 7/2004 | Tajali et al. |
| 2004/0153650 A1 | 8/2004 | Hillmer |
| 2004/0167906 A1 | 8/2004 | Smith et al. |
| 2004/0172551 A1 | 9/2004 | Fielding et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0022014 A1 | 1/2005 | Shipman |
| 2005/0050336 A1 | 3/2005 | Liang et al. |
| 2005/0071633 A1 | 3/2005 | Rothstein |
| 2005/0081053 A1 | 4/2005 | Aston et al. |
| 2005/0086047 A1 | 4/2005 | Uchimoto et al. |
| 2005/0091321 A1 | 4/2005 | Daniell et al. |
| 2005/0091487 A1 | 4/2005 | Cross et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0256907 A1 | 11/2005 | Novik et al. |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0278784 A1 | 12/2005 | Gupta et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075299 A1 | 4/2006 | Chandramouleeswaran et al. |
| 2006/0075478 A1 | 4/2006 | Hyndman et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0232265 A1 | 10/2007 | Park et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0297333 A1 | 12/2007 | Zuk et al. |
| 2007/0297396 A1 | 12/2007 | Eldar et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0059123 A1 | 3/2008 | Estberg et al. |
| 2008/0082662 A1 | 4/2008 | Dandliker et al. |
| 2008/0082977 A1 | 4/2008 | Araujo et al. |
| 2008/0086513 A1 | 4/2008 | O'Brien |
| 2008/0115012 A1 | 5/2008 | Jann et al. |
| 2008/0120499 A1 | 5/2008 | Zimmer et al. |
| 2008/0141371 A1 | 6/2008 | Bradicich et al. |
| 2008/0155336 A1 | 6/2008 | Joshi et al. |

(56) References Cited

U.S. PATENT DOCUMENTS

| | | |
|---|---|---|
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0295173 A1 | 11/2008 | Tsvetanov |
| 2008/0301770 A1 | 12/2008 | Kinder |
| 2008/0307524 A1 | 12/2008 | Singh et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0178110 A1 | 7/2009 | Higuchi |
| 2009/0220080 A1 | 9/2009 | Herne et al. |
| 2009/0249053 A1 | 10/2009 | Zimmer et al. |
| 2009/0249438 A1 | 10/2009 | Litvin et al. |
| 2009/0320010 A1* | 12/2009 | Chow .................. G06F 11/3612 717/154 |
| 2009/0320133 A1 | 12/2009 | Viljoen et al. |
| 2009/0328144 A1 | 12/2009 | Sherlock et al. |
| 2009/0328185 A1 | 12/2009 | Berg et al. |
| 2010/0049973 A1 | 2/2010 | Chen |
| 2010/0071035 A1 | 3/2010 | Budko et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0299277 A1* | 11/2010 | Emelo .................... G06Q 50/20 705/319 |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0061092 A1 | 3/2011 | Bailloeul et al. |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0246753 A1 | 10/2011 | Thomas |
| 2011/0302647 A1 | 12/2011 | Bhattacharya et al. |
| 2012/0030731 A1 | 2/2012 | Bhargava et al. |
| 2012/0030750 A1 | 2/2012 | Bhargava et al. |
| 2012/0110666 A1 | 5/2012 | Ogilvie |
| 2012/0159631 A1 | 6/2012 | Niemela et al. |
| 2012/0216271 A1 | 8/2012 | Cooper et al. |
| 2012/0233611 A1* | 9/2012 | Voccio ................ G06F 9/45558 718/1 |
| 2012/0278853 A1 | 11/2012 | Roy-Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0179971 A1* | 7/2013 | Harrison ................ G06F 21/55 726/23 |
| 2013/0227683 A1 | 8/2013 | Bettini et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247201 A1 | 9/2013 | Alperovitch et al. |
| 2013/0247226 A1 | 9/2013 | Sebes et al. |
| 2013/0268994 A1 | 10/2013 | Cooper et al. |
| 2014/0090061 A1 | 3/2014 | Avasarala et al. |
| 2014/0101783 A1 | 4/2014 | Bhargava et al. |
| 2014/0189859 A1 | 7/2014 | Ramanan et al. |
| 2014/0237584 A1 | 8/2014 | Cooper et al. |
| 2014/0250492 A1 | 9/2014 | Cooper et al. |
| 2014/0283065 A1 | 9/2014 | Teddy et al. |
| 2014/0283066 A1 | 9/2014 | Teddy et al. |
| 2014/0317592 A1 | 10/2014 | Roy-Chowdhury et al. |
| 2014/0351895 A1 | 11/2014 | Bhargava et al. |
| 2015/0121449 A1 | 4/2015 | Chandan |
| 2015/0180884 A1 | 6/2015 | Bhargava et al. |
| 2015/0180997 A1 | 6/2015 | Ramanan et al. |
| 2015/0200968 A1 | 7/2015 | Bhargava et al. |
| 2015/0365380 A1 | 12/2015 | Cooper et al. |
| 2016/0105444 A1 | 4/2016 | Roy-Chowdhury et al. |

FOREIGN PATENT DOCUMENTS

| | | |
|---|---|---|
| CN | 101218568 A | 7/2008 |
| CN | 101569129 | 10/2009 |
| CN | 101636998 A | 1/2010 |
| CN | 103283202 A | 9/2013 |
| EP | 1 482 394 A2 | 12/2004 |
| EP | 2 037 657 A1 | 3/2009 |
| EP | 2599026 | 6/2013 |
| EP | 2599276 | 6/2013 |
| JP | 2004/524598 A | 8/2004 |
| JP | 2004-078507 A | 11/2004 |
| JP | 2005-275839 | 6/2005 |
| JP | 2005-202523 | 7/2005 |
| JP | 2006-59217 | 3/2006 |
| JP | 2006-270894 A | 5/2006 |
| JP | 2006-302292 | 11/2006 |
| JP | 2007-500396 | 1/2007 |
| JP | 2008-506303 | 2/2008 |
| JP | 2008-217306 | 9/2008 |
| JP | 2008-546060 A | 12/2008 |
| JP | 2009-510858 | 3/2009 |
| JP | 2010-16834 | 1/2010 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2007/016478 A2 | 2/2007 |
| WO | WO 2008/054997 A2 | 5/2008 |
| WO | WO 2011/003958 A1 | 1/2011 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |
| WO | WO 2013/058940 | 4/2013 |
| WO | WO 2013/058944 | 4/2013 |
| WO | WO 2014/105308 A1 | 7/2014 |
| WO | WO 2015/060857 A1 | 4/2015 |

OTHER PUBLICATIONS

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

Kurt Gutzmann, "Access Control and Session Management in the HTTP Environment," Jan./Feb. 2001, pp. 26-35, IEEE Internet Computing.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 11/060,683, entitled "Distribution and Installation of

(56) References Cited

OTHER PUBLICATIONS

Solidified Software on a Computer," filed Feb. 16, 2005, Inventor(s): Bakul Shah et al.
U.S. Appl. No. 11/379,953, entitled "Software Modification by Group to Minimize Breakage," filed Apr. 24, 2006, Inventor(s): E. John Sebes et al.
U.S. Appl. No. 11/437,317, entitled "Connectivity-Based Authorization," filed May 18, 2006, Inventor(s): E. John Sebes et al.
U.S. Appl. No. 12/008,274, entitled Method and Apparatus for Process Enforced Configuration Management, filed Jan. 9, 2008, Inventor(s): Rishi Bhargava et al.
U.S. Appl. No. 12/291,232, entitled "Method of and System for Computer System State Checks," filed Nov. 7, 2008, inventor(s): Rishi Bhargava et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/322,220, entitled "Method of and System for Malicious Software Detection Using Critical Address Space Protection," filed Jan. 29, 2009, Inventor(s): Suman Saraf et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
Barrantes et al., "Randomized Instruction Set Emulation to Disrupt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Tal Garfinkel, et al., "Terra: A Virtual Machine-Based Platform for Trusted Computing," XP-002340992, SOSP'03, Oct. 19-22, 2003, 14 pages.
U.S. Appl. No. 12/880,125, entitled "System and Method for Clustering Host Inventories," filed Sep. 12, 2010, Inventor(s) Rishi Bhargava, et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 13/012,138, entitled "System and Method for Selectively Grouping and Managing Program Files," filed Jan. 24, 2011, Inventor(s) Rishi Bhargava, et al.
U.S. Appl. No. 13/037,988, entitled "System and Method for Botnet Detection by Comprehensive Email Behavioral Analysis," filed Mar. 1, 2011, Inventor(s) Sven Krasser, et al.
U.S. Appl. No. 12/322,321, entitled "Method of and System for Computer System Denial-of-Service Protection," filed Jan. 29, 2009, Inventor(s): Suman Saraf et al.
IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Appl. No. 13/558,181, entitled "Method and Apparatus for Process Enforced Configuration Management," filed Jul. 25, 2012, Inventor(s) Rishi Bhargava et al.
U.S. Appl. No. 13/558,227, entitled "Method and Apparatus for Process Enforced Configuration Management," filed Jul. 25, 2012, Inventor(s) Rishi Bhargava et al.
U.S. Appl. No. 13/558,277, entitled "Method and Apparatus for Process Enforced Configuration Management," filed Jul. 25, 2012, Inventor(s) Rishi Bhargava et al.
VMware vSphere™ Experience Game-changing Virtual Machine Mobility, copyright 2012 VMware, Inc., retrieved from website: http://www.vmware.com/products/vmotion/overview.html, printed Aug. 7, 2012, 2 pages.
VMware vSphere™ Features of VMware vMotion for Live Migration of Virtual Machines, copyright 2012 VMware, Inc., retrieved from http://www.vmware.com/products/vmotion/features.html, printed Aug. 7, 2012, 2 pages.
VMware VMotion Product Datasheet, How is VMware VMotion Used in the Enterprise?, copyright 2009 VMware, Inc., retrieved from http://www.vmware.com/files/pdf/VMware-VMotion-DS-EN.pdf, printed Aug. 7, 2012, 2 pages.
Citrix, CTX 115813—FAX: XenMotion, Live Migration—Citrix Knowledge Center, copyright 1999-2012 Citrix Systems, Inc., retrieved from http://support/citrix.com/article/CTX115813 on Aug. 7, 2012, 2 pages.
Citrix® , Citrix Synchronizer™ 1.0 RC Administrator Guide, Published May 11, 2010, copyright 2009 Citrix, 32 pages.
USPTO Dec. 16, 2013 Notice of Allowance received for U.S. Appl. No. 13/558,227, 10 pages.
U.S. Appl. No. 14/127,395, entitled "Agent Assisted Malicious Application Blocking in a Network Environment," filed Dec. 18, 2013, Inventors: Chandan CP et al., 76 pages.
Patent Examination Report No. 1, Australian Application No. 2011283164, mailed Jan. 14, 2014, 6 pages.
International Search Report and Written Opinion, International Application No. PCT/US2013/071327, mailed Mar. 7, 2014, 12 pages.
U.S. Appl. No. 14/257,770, entitled "Enforcing Alignment of Approved Changes and Deployed Changes in the Software Change Life-Cycle," filed Apr. 21, 2014, Inventors: Rahul Roy-Chowdhury et al., 56 pages.
International Preliminary Report on Patentability in International Application No. PCT/US2012/057312, mailed Apr. 22, 2014, 5 pages.
International Preliminary Report on Patentability in International Application No. PCT/US2012/057153, mailed Apr. 22, 2014, 4 pages.
U.S. Appl. No. 14/263,164, entitled "System and Method for Redirected Firewall Discovery in a Network Environment," filed Apr. 28, 2014, Inventors: Geoffrey Cooper et al., 38 pages.
U.S. Appl. No. 14/277,954, entitled "System and Method for Interlocking a Host and a Gateway," filed May 15, 2014, Inventors: Geoffrey Cooper et al., 42 pages.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct.

(56) References Cited

OTHER PUBLICATIONS 24, 2012], <http://citeseerx.lst.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment," Inventors Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion mailed Dec. 14, 2012 for International Application No. PCT/US2012/055674, 9 pages.
International Preliminary Report on Patentability and Written Opinion issued Jan. 29, 2013 for International Application No. PCT/US2011/020677 (9 pages).
International Preliminary Report on Patentability and Written Opinion issued Jan. 29, 2013 for International Application No. PCT/US2011/024869 (6 pages).
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID-22, 4 pages.

Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
International Search Report and Written Opinion, International Application No. PCT/US2012/026169, mailed Jun. 18, 2012, 11 pages.
International Search Report and Written Opinion, International Application No. PCT/US2012/057312, mailed Jan. 31, 2013, 10 pages.
International Search Report and Written Opinion, International Application No. PCT/US2012/057153, mailed Dec. 26, 2012, 8 pages.
U.S. Appl. No. 13/437,900, filed Apr. 2, 2012, entitled "System and Method for Interlocking a Host and a Gateway," Inventors: Geoffrey Howard Cooper, et al.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, mailed Aug. 27, 2013, 8 pages.
USPTO Aug. 14, 2013 Notice of Allowance from U.S. Appl. No. 13/540,448.
U.S. Appl. No. 14/045,208, filed Oct. 3, 2013, entitled "Execution Environment File Inventory," Inventors: Rishi Bhargava, et al., 33 pages.
USPTO Terminal Disclaimer of 7,757,269 from U.S. Appl. No. 13/540,448, filed Jul. 10, 2013, 1 page.
USPTO Terminal Disclaimer of 8,234,713 from U.S. Appl. No. 13/540,448, filed Jul. 10, 2013, 1 page.
USPTO Office Action received for U.S. Appl. No. 13/540,448, mailed on Apr. 10, 2013, 20 pages.
USPTO Office Action received for U.S. Appl. No. 13/558,181, mailed on Aug. 7, 2013, 13 pages.
USPTO Office Action received for U.S. Appl. No. 13/558,181, mailed on May 8, 2013, 13 pages.
USPTO Office Action received for U.S. Appl. No. 13/558,227, mailed on Aug. 6, 2013, 13 pages.
USPTO Office Action received for U.S. Appl. No. 13/558,227, mailed on May 8, 2013, 22 pages.
USPTO Office Action received for U.S. Appl. No. 13/558,277, mailed on Oct. 3, 2013, 11 pages.
USPTO Office Action received for U.S. Appl. No. 13/558,277, mailed on May 10, 2013, 22 pages.
USPTO Office Action received for U.S. Appl. No. 12/291,232, mailed on Oct. 18, 2011, 17 pages.
USPTO Office Action received for U.S. Appl. No. 12/291,232, mailed on Apr. 25, 2011, 23 pages.
PCT Application Serial No. PCT/US13/66690, filed Oct. 24, 2013, entitled "Agent Assisted Malicious Application Blocking in a Network Environment,", 67 pages.
Patent Examination Report No. 1, Australian Application No. 2011283160, mailed Oct. 30, 2013, 3 pages.
PCT Application Serial No. PCT/US13/71327, filed Nov. 21, 2013, entitled "Herd Based Scan Avoidance System in a Network Environment,", 46 pages.
USPTO Dec. 6, 2013 Notice of Allowance received for U.S. Appl. No. 13/558,181, 10 pages.
USPTO Dec. 6, 2013 Notice of Allowance from U.S. Appl. No. 13/540,448, 7 pages.
"Optical stateful security filtering approach based on code words," Sliti, M.; Boudriga, N., 2013 IEEE Symposium on Computers and Communications (ISCC), 10 pages.

(56) References Cited

OTHER PUBLICATIONS

Rothenberg, et al., "A Review of Policy-Based Resource and Admission Control Functions in Evolving Access and Next Generation Networks," Journal of Network and Systems Management, 16.1 (2008: 14-45, 32 pages.
USPTO Oct. 3, 2014 Nonfinal Rejection from U.S. Appl. No. 14/257,770, 8 pages.
Muttik, Igor, and Chris Barton, "Cloud security technologies," Information security technical report 14.1 (2009), 1-6, 6 pages.
USPTO Mar. 15, 2016 Nonfinal Rejection from U.S. Appl. No. 14/251,009, 30 pages.
USPTO Apr. 11, 2016 Notice of Allowance from U.S. Appl. No. 12/291,232, 14 pages.
USPTO May 24, 2016 Notice of Allowance from U.S. Appl. No. 14/045,208, 14 pages.
USPTO Jun. 2, 2016 Nonfinal Rejection from U.S. Appl. No. 14/848,522, 10 pages.
USPTO Jun. 24, 2016 Final Rejection from U.S. Appl. No. 14/251,009, 16 pages.
USPTO Jun. 5, 2013 Notice of Allowance from U.S. Appl. No. 11/437,317, 8 pages.
USPTO Jun. 10, 2013 Notice of Allowance from U.S. Appl. No. 12/976,159, 9 pages.
USPTO Nonfinal Rejection received for U.S. Appl. No. 12/291,232, mailed on Jan. 14, 2015, 45 pages.
USPTO Feb. 12, 2015 Final Rejection from U.S. Appl. No. 14/257,770, 6 pages.
Baba, Tatsuya, et al., "A Proposal of an Integrated Worm Countermeasure System Based on Dynamic VLAN Control," Journal of Information Processing Society of Japan, Japan, Information Processing Society of Japan, Aug. 15, 2006, vol. 47, No. 8, pp. 2449-2511, 14 pages, English language Abstract only.
Fujita, Keisuke, et al., "Proposal of DF system with boot control function against unauthorized programs," Transactions of Computer Security Symposium 2007, Japan, Information Processing Society of Japan, Oct. 31, 2007, vol. 2007, No. 10, pp. 501-506, 7 pages, English language Abstract only.
Ashiwa, Takashi, "IT Keyword too late to ask: Bot," Nikkei Computer, Japan, Nikkei Business Publications, Oct. 30, 2006, No. 664, pp. 244-249, 7 pages [with English language translation].
USPTO Apr. 28, 2015 Notice of Allowance from U.S. Appl. No. 14/257,770, 8 pages.
Cheneau, Tony, et al., "Significantly improved performances of the cryptographically generated addresses thanks to ECC and GPGPU," Computers & Security, vol. 29, No. 4, Jun. 2010 (Jun. 2010), pp. 419-431, 13 pages.
USPTO Jul. 10, 2015 Nonfinal Rejection from U.S. Appl. No. 14/045,208, 41 pages.
USPTO Jul. 20, 2015 Nonfinal Rejection from U.S. Appl. No. 14/251,009, 40 pages.
USPTO Final Rejection received for U.S. Appl. No. 12/291,232, mailed on Aug. 5, 2015, 25 pages.
U.S. Appl. No. 14/848,522, entitled "Enforcing Alignment of Approved Changes and Deployed Changes in the Software Change Life-Cycle," filed Sep. 9, 2015, Inventors: Rahul Roy-Chowdhury et al., 41 pages.
USPTO Nov. 10, 2015 Final Rejection from U.S. Appl. No. 14/251,009, 13 pages.
USPTO Nov. 13, 2015 Final Rejection from U.S. Appl. No. 14/045,208, 36 pages.
USPTO Sep. 30, 2016 Advisory Action from U.S. Appl. No. 14/251,009, 5 pages.
USPTO Oct. 12, 2016 Notice of Allowance from U.S. Appl. No. 14/045,208, 9 pages.
USPTO Nov. 10, 2016 Notice of Allowance from U.S. Appl. No. 14/848,522, 28 pages.

* cited by examiner

SYSTEM AND METHOD FOR PASSIVE THREAT DETECTION USING VIRTUAL MEMORY INSPECTION

TECHNICAL FIELD

This disclosure relates in general to the field of network security and, more particularly, to a system and method for passive threat detection using virtual memory inspection.

BACKGROUND

The evolution of virtualization techniques in information technology has led to a variety of applications, from cloud-based computing to embedded systems in mobile phones. In general, virtualization obscures hardware characteristics of a computing platform and instead presents an abstract platform that can host other platforms, including complete operating systems. One popular virtualization technique is to deploy a hypervisor (also known as a virtual machine manager or virtual machine layer) that can allow multiple guest machines implemented in the form of software (including complete operating systems) to run concurrently on an abstract host platform. The hypervisor can provide a simulated computing environment, often referred to as a "virtual machine," for its guest machine. Thus, multiple guest machines and, therefore, multiple operating systems, which can be different or the same, can run in separate virtual partitions under a hypervisor on a single chassis, for example.

While virtualization provides many advantages, virtual machines are likely to become more popular targets for malicious attacks as the number of deployed virtual machines increases. In addition, virtualization can also present unique security challenges. For example, memory inspections of a host being monitored for malware and other threats are often invasive and can adversely affect performance of the host. Hence, many challenges remain for providing a secure virtualization platform.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes synchronizing a first memory page set with a second memory page set of a virtual guest machine, inspecting the first memory page set off-line, and detecting a threat in the first memory page set. The method further includes taking an action based on the threat. In more specific embodiments, synchronizing the first memory page set with the second memory page set includes updating the first memory page set with a subset of the second memory page set at an expiration of a synchronization interval, if the subset was modified during the synchronization interval. In further embodiments, the second memory page set of the virtual guest machine represents non-persistent memory of the virtual guest machine. In further embodiments, inspecting the first memory page set includes analyzing at least one of kernel data structures and user data structures. In other more specific embodiments, the action includes sending a communication via a feedback loop to a security manager. The action can include at least one of shutting down the virtual guest machine and alerting an administrator.

Example Embodiments

Figure 1:
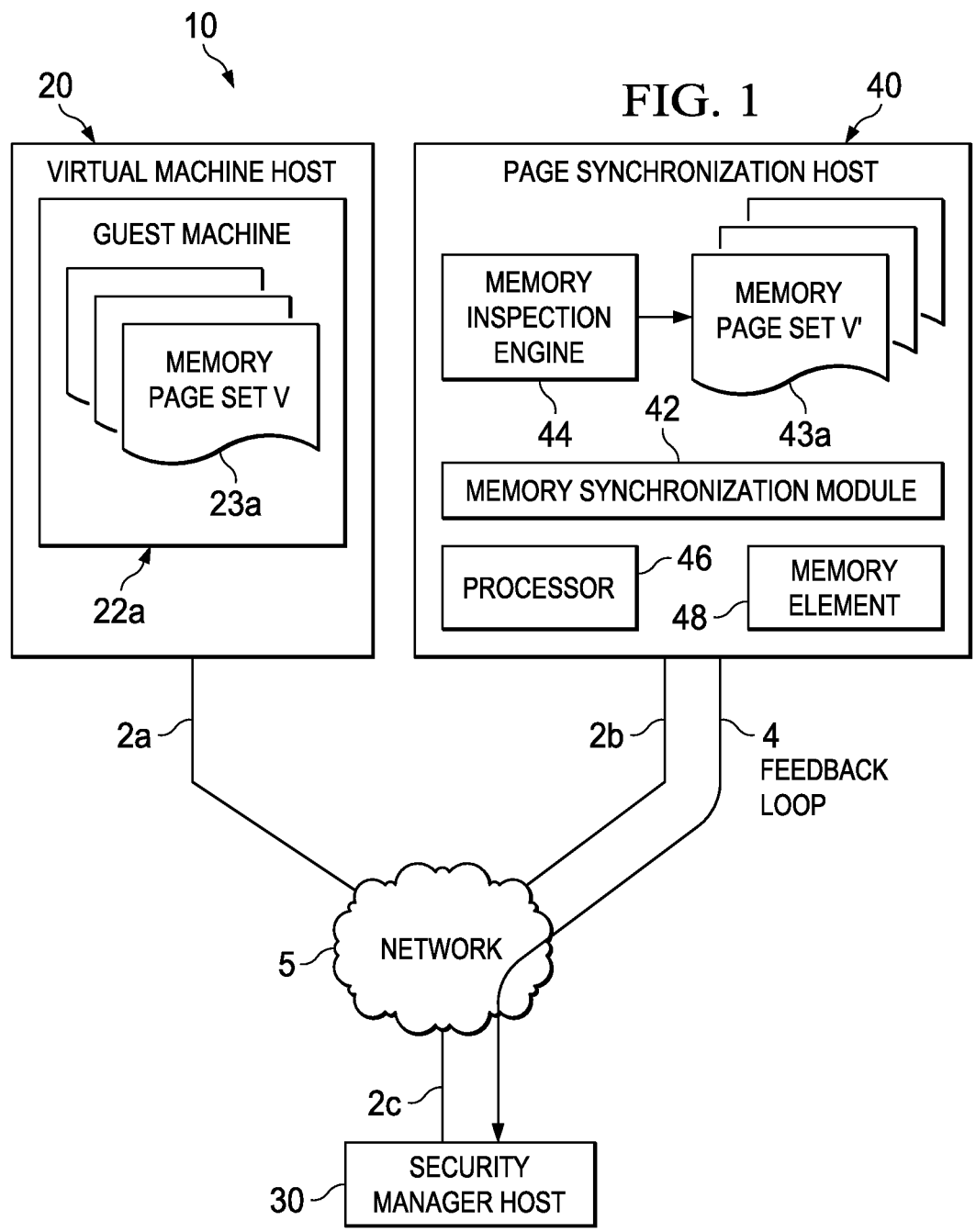
FIG. 1 is a simplified block diagram illustrating an example network environment in which passively detecting threats using virtual memory inspection may occur in accordance with the present disclosure.

FIG. 1 is a simplified block diagram illustrating an example embodiment of a network environment 10 in which a system and method for passive threat detection using virtual memory inspections may be implemented in accordance with the present disclosure. Network environment 10 can include a virtual machine host 20, a security manager host 30, and a page synchronization host 40, which are configured to communicate via network 5. Network 5 represents any suitable network for electronic communications such as a Transmission Control Protocol/Internet Protocol (TCP/IP) network. Virtual machine host 20 includes at least one virtual guest machine 22a with a memory page set V 23a representing physical memory of virtual guest machine 22a at a particular point in time. It should be noted that 'virtual guest machine,' 'virtual machine,' and 'guest machine' are used interchangeably herein. Page synchronization host 40 may include a memory synchronization module 42, a memory inspection engine 44, a processor 46, and a memory element 48. In addition, a memory page set V' 43a may also be stored on or otherwise accessible to page synchronization host 40. Memory page set V' 43a represents a synchronized copy of memory page set V 23a. Finally, a feedback loop 4 may be provided to operably couple page synchronization host 40 to security manager host 30.

In example embodiments, a system for passively detecting threats using virtual memory inspections can enable near real-time threat monitoring on a host with a minimal impact on host processing. In one example shown in FIG. 1, a hot or live migration tool may be utilized to identify physical memory pages of a virtual machine that have been modified during a synchronization interval (i.e., a period of time after which a set of memory pages of a virtual machine is synchronized with another set, or copy, of the memory pages). A copy of the memory pages of the virtual machine may be synchronized with physical memory pages of the virtual machine by updating the copy each time a synchronization interval has expired and any physical memory pages on the virtual machine have been modified or changed in any way. In some embodiments, when a synchronization interval expires and a copy of memory pages is 'synchronized' with physical memory pages on a virtual machine, the copy of the memory pages is at least substantially the same (and, in some cases, exactly the same) as the physical memory pages on the virtual machine existing at the time the synchronization interval expired.

Any suitable memory inspection techniques may be used to evaluate a synchronized copy of a virtual machine's physical memory pages, and particularly, the updated memory pages therein to determine whether a threat is present. As used herein, a 'threat' is intended to include any feature (e.g., configuration, data, file, program, software, signature, host intrusion, etc.) that indicates the security of a computer may be compromised and/or any unauthorized activity designed to interfere with the normal operation of a computer. Threats on a virtual machine can be detected by analyzing memory pages of the virtual machine. Criteria used to determine whether a particular feature or activity is a threat can be implemented in policies and can be configured by an administrator or other authorized person, configured and/or continuously updated by a trusted third party entity (e.g., software security services entity), configured in security software or data associated with relevant memory inspection techniques, or any suitable combination thereof. Examples of threats include, but are not limited to, malicious software ('malware'), abnormal kernel configurations, programs of a system not conforming to policy, etc. If a threat is detected, a feedback loop may be used to send a message (or other suitable communication) to a security manager or possibly directly to the affected host. The security manager may be configured to take any appropriate action based on the detected threat and policies implemented in host environment 10. In addition, a network administrator and/or other appropriate individuals may be notified if a threat is detected on a host.

For purposes of illustrating the techniques of the system for passively detecting threats using virtual memory inspections, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments of organizations and individuals often include multiple computers such as, for example, end user desktops, laptops, servers, network appliances, other network elements, etc. Network environments of large organizations may include hundreds or thousands of computers, which may span different buildings, cities, and/or geographical areas around the world. Information Technology (IT) administrators may be tasked with the extraordinary responsibility of maintaining the security and integrity of these computers in a way that minimizes or eliminates disruption to business activities.

IT administrators typically utilize security software to protect network environments from malicious software. As used herein, the term 'malicious software' (also referred to as 'malware') generally includes any software designed to access and/or control a computer without the informed consent of an authorized entity (e.g., computer owner or user) and can include, for example, binary programs, library modules, code, instruction sets, functions, executable files, scripts, or the like. Malware is commonly used to reference any hostile, intrusive, or annoying software such as a computer virus, spyware, adware, etc. Numerous types of security software solutions can be utilized to ensure the safety and security of the network environment, which is inclusive of hardware, software, and confidential data.

One approach for evaluating compliance, configuration, and security of a system includes security software designed to perform memory inspections using system state checks of a host. A state of a system can include, but is not limited to, the existence of files on a storage system, file permissions, file content, file permissions, registry key existence, registry key variables, network configuration, hardware configuration, data structures within an operating system kernel, hardware states, processor state, database configuration, database content, and user permission levels. In addition to security purposes, a state of a system may also be used for other purposes such as system auditing and system compliance checking. Accordingly, there is a need to quickly and with minimal impact capture and analyze the state of a system.

Security products that perform these memory inspections, such as a host intrusion detection system (IDS) or a host intrusion prevention system (IPS), are typically installed either within an operating system of a host being monitored or within a hypervisor if a host is virtualized. Both of these methods are generally considered invasive and may not be acceptable in certain environments. For example, a customer may not want to install an IDS or IPS on a host system due to performance or compatibility reasons. Furthermore, a customer may not want to install an IDS or IPS in a hypervisor due to possible breach of support contracts with a vendor of the hypervisor.

In some security software configured for a virtualized computer, processing units may run guest machines that typically include application software and a kernel that interfaces with computational hardware and system resources through a virtual machine layer (or hypervisor). The virtual machine layer can make it appear to each guest machine that it is exclusively running on the hardware. Each guest machine can have agent software, each of which demands from the hardware computation processing, power to execute, and time and expense to install, maintain, and upgrade. The drain on system resources, processing power, and time for maintenance increases linearly with each additional guest machine. This configuration does not provide economies of scale with an increasing number of guest machines.

In U.S. patent application Ser. No. 12/291,232, filed Nov. 7, 2008, by Rishi Bhargava, et al., entitled "Method of and System for Computer System State Checks," (the '232 Application), a system for performing computer system state checks on a virtualized platform is disclosed. The system relies on a state snapshot server, which controls a virtual machine layer to take system state snapshots of virtual machines in order to perform state checks. The state snapshot server can execute on a guest machine or on hardware coupled to communicate with the virtual machine layer directly or through a network. Although this system can be effective in capturing a state of a system, it may not be acceptable in certain environments to use a technique that is considered invasive with respect to the virtual machine layer (or hypervisor). Thus, a need exists for passive threat detection in which an operating system of a host being monitored is unaware that such protection is enabled.

A system and method for passive threat detection using virtual memory inspections, as provided in network environment 10 of FIG. 1, can resolve many of these issues, and others. Embodiments in the present disclosure provide for capturing a state of a system (e.g., a virtual machine host) by using a mechanism to transfer physical memory pages from the virtual machine host to a page synchronization host when the memory pages have been modified, for example, by a guest operating system on the virtual machine host. A synchronized copy of the physical memory pages on the virtual machine host may be kept on the page synchronization host (or in any other suitable memory). Various memory inspection techniques may be used to analyze the synchronized memory page set and to determine whether a threat is present. Thus, embodiments in the present disclosure provide for memory inspections that are performed in near real-time and are not reliant on a product that leaves a footprint on a host operating system or within a hypervisor of a virtual machine host.

Note that in this Specification, references to various elements (e.g., structures, modules, components, steps, operations, etc.) included in 'one embodiment', 'example embodiment', 'an embodiment', 'another embodiment', 'some embodiments', 'various embodiments', 'one example', 'other embodiments', and the like are intended to mean that any such features may be included in one or more embodiments of the present disclosure.

Turning to the infrastructure of FIG. 1, network environment 10 is one possible network configuration illustrating embodiments of a system in which threats can be passively detected using virtual memory inspections. Network 5 may be configured as one or more networks in any suitable form including, but not limited to, local area networks (LANs), wireless local area networks (WLANs), virtual local area networks (VLANs), metropolitan area networks (MANs), wide area networks (WANs) such as the Internet, virtual private networks (VPNs), Intranet, Extranet, any other appropriate architecture or system, or any suitable combination thereof that facilitates communications in a network.

Routers, switches, and any other suitable network elements may also be provisioned in network environment 10 to facilitate electronic communication between virtual machine host 20, page synchronization host 40, and security manager host 30. Note that network environment 10 may include a configuration capable of transmission control protocol/internet protocol (TCP/IP) communications for the transmission and/or reception of packets in the network. Network environment 10 could also operate in conjunction with a user datagram protocol/IP (UDP/IP) or any other suitable protocol, where appropriate and based on particular needs.

Communication links 2a-c of network 5 may represent any electronic links supporting connections between virtual machine host 20, page synchronization host 40, and security manager host 30. Communication links 2a-c can be configured as any appropriate medium (e.g., digital subscriber lines (DSL), telephone lines, T1 lines, T3 lines, wireless, satellite, fiber optics, cable, Ethernet, etc. or any combination thereof) and/or through any networks such as the Internet. Moreover, one or more of communication links 2a-c may be virtualized. In addition, each of the hosts in FIG. 1 (i.e., virtual machine host 20, security manager host 30, and page synchronization host 40) can include suitable interfaces and communication protocols for receiving, transmitting, and/or otherwise communicating data or information via network 5, for example, across communication links 2a-c, which may include feedback loop 4. As used herein, the term "data" refers generally to any type of numeric, voice, video, or script data, or any type of source or object code, or any other suitable information in any appropriate format that may be communicated from one point to another in electronic devices and/or networks.

Virtual machine host 20 generally represents any computer in a network environment such as network environment 10, which has the potential to be infected by malware or other threats and which operates on a virtual platform. In one embodiment, virtual machine host 20 is a computer connected to a TCP/IP network, including the Internet, and has its own IP address. Virtual machine host 20 could be a virtualized network element, which encompasses email gateways, web gateways, network appliances, servers, firewalls, routers, switches, bridges, load balancers, or any other suitable device or component operable to affect or process electronic information in a network environment. In other examples, virtual machine host 20 could be a virtualized end point device that serves as a terminal point for a network connection, in contrast to a gateway or firewall. Such end point devices are inclusive of end user devices (e.g., personal computers, laptops, desktops, etc.), mobile devices (e.g., smart phones, iPads, personal digital assistants (PDAs), etc.), networked TVs, embedded devices (e.g., smart home appliances, printers, GPS receivers, videogame consoles, factory or plant controllers, and any other devices or systems designed to perform one or a few dedicated functions), and any other similar electronic devices.

As shown in FIG. 1, virtual machine host 20 includes at least one virtual guest machine 22a with physical memory page set V 23a. Memory page set V 23a represents physical memory pages containing non-persistent state information of virtual guest machine 22a. Generally, non-persistent state information is associated with runtime information. Non-persistent state information includes physical memory, which comprises associated user memory and associated kernel memory. State information found in kernel memory (kernel state information) can include application runtimes, kernel runtime data structures, open network ports, network sockets connected with particular hosts, users logged into the system, virtual hardware configuration state information, and processor state information, or any suitable combination thereof. State information found in user memory (user state information) can include information on what programs a user is running and the state of user data structures that can indicate the presence of malware.

Regarding an internal structure associated with page synchronization host 40, hardware elements include memory element 48 for storing information to be used in the passive threat detection operations outlined herein. Additionally, page synchronization host 40 includes processor 46, which can include one or more virtual processors, for executing software or an algorithm to perform the activities as discussed herein.

These devices may further keep information in any suitable memory element (random access memory (RAM), read only memory (ROM), erasable programmable ROM (EPROM), electrically erasable programmable ROM (EEPROM), application specific integrated circuit (ASIC), etc.), software, hardware, or in any other suitable component or device, where appropriate and based on particular needs. Any of the memory items discussed herein should be construed as being encompassed within the broad term 'memory element.' Information and data being tracked or sent by hosts in network environment 10 could be provided in any database, register, table, index, queue, control list, or storage structure, all of which can be referenced at any suitable timeframe. Any such storage options may be included within the broad term 'memory element' as used herein.

In various embodiments, these components (e.g., page synchronization host 40, security manager host 30, and virtual machine host 20) include software (or reciprocating software) that can coordinate, manage, or otherwise cooperate in order to achieve the passive threat detection operations, as outlined herein. One or more of these components may include any suitable algorithms, hardware, software, modules, interfaces, or objects that facilitate the operations thereof. Note that in certain example implementations, the functions outlined herein may be implemented by logic encoded in one or more tangible, non-transitory media (e.g., embedded logic provided in an ASIC, digital signal processor (DSP) instructions, software (potentially inclusive of object code and source code) to be executed by a processor, or other similar machine, etc.). In some of these instances, a memory element (e.g., memory element 48) can store data used for the operations described herein. This includes the memory element being able to store software, logic, code, or processor instructions that are executed to carry out the activities described herein.

A processor (e.g., processor 46) can execute any type of instructions associated with the data to achieve the operations detailed herein. In one example, a processor could transform an article (e.g., data) from one state or thing to another state or thing. In another example, the activities outlined herein may be implemented with fixed logic or programmable logic (e.g., software/computer instructions executed by a processor) and the processing components identified herein could be some type of a programmable processor, programmable digital logic (e.g., a field programmable gate array (FPGA), an EPROM, an EEPROM), or an ASIC that includes digital logic, software, code, electronic instructions, or any suitable combination thereof. Any of the potential processing components, modules, and machines described herein should be construed as being encompassed within the broad term 'processor.'

Not shown in FIG. 1 is additional hardware that may be suitably coupled to processor 46 (e.g., a single central processing unit (CPU), multiple physical CPUs, or a multi-core CPU) in the form of memory management units (MMU), additional symmetric multiprocessing (SMP) elements, peripheral component interconnect (PCI) bus and corresponding bridges, small computer system interface (SCSI)/integrated drive electronics (IDE) elements, etc. Any suitable operating systems may also be configured in page synchronization host 40 to appropriately manage the operation of hardware components therein. Additionally, page synchronization host 40 may also be implemented on a virtual platform.

Page synchronization host 40 can use memory synchronization techniques, via memory synchronization module 42, while communicating with virtual machine host 20, to keep memory page set V' 43a synchronized with memory page set V 23a of guest machine 22a. In some embodiments, existing memory page synchronization technology in products of VMware, Inc. of Palo Alto, Calif. and Citrix Systems, Inc. of Fort Lauderdale, Fla. can be used to maintain synchronized memory page set V' 43a. VMware® and Citrix® products currently implement mechanisms for transferring a virtual guest machine's physical memory pages from a first virtual machine server to a second virtual machine server in order to perform a live or "hot" migration of the virtual guest machine between the virtual machine servers. In VMware® VMotion product and Citrix® VM relocation feature of Xen Server product, physical memory pages of a guest machine on a first virtual machine server are transferred to a second virtual machine server as they are modified by a guest operating system of the guest machine. Thus, two virtual machine servers can have synchronized sets of the physical memory pages required for the guest operating system to run. Transferring the guest machine between the virtual machine servers can require pausing execution of the guest machine on the first virtual machine server and starting execution of the guest machine on the second virtual machine server. By using this existing technology to copy physical memory pages to another machine, but without enabling actual migration of processing, synchronized memory page set V' 43a can be maintained by page synchronization host 40 and analyzed to detect malware or other potential threats in the state information.

Memory inspection engine 44 of page synchronization host 40 can analyze the synchronized memory page set V' 43a. Various memory inspection techniques may be used to implement memory inspection engine 44. Inspection techniques disclosed in the '232 Application, other existing memory inspection techniques, and any appropriate future memory inspection techniques may be used. Since the synchronized memory page set V' 43a can be updated whenever changes are made to any of the physical memory pages of memory page set V 23a, memory inspection engine 44 can continuously inspect the synchronized memory page set V' 43a or relevant portions thereof.

Memory inspection techniques described in the '232 Application comprise system security checks that can involve analysis of a combination of state information, such as user memory and kernel memory. Analysis of the state information can be performed in terms of a policy. The policy can be an information structure containing parameters, characteristics, ranges, criteria, and specific data relating to system state information that is captured and analyzed. Preferably, policy information is configurable and stored in any suitable storage device accessible by memory inspection engine 44. For example, the policy can be a file stored on a memory element directly coupled to memory inspection engine 44 (e.g., via page synchronization host 40) or on a memory element on a network through which memory inspection engine 44 can communicate.

In addition, policy information may be coded within memory inspection engine 44. The policy may specify attributes or criteria by which to analyze a piece of the state information. For example, the policy information can set ranges for state information such as, but not limited to, registry value ranges, database value ranges, environment or system variable ranges, and minimum password lengths. System characteristics can include whether a file is writeable and who has permission to change, delete, etc. a file. Persistent information from the registry, etc. can be in memory in some instances and, therefore, can be inspected there. Furthermore, the policy for runtime information can include criteria indicating which processes should be running, who can be logged in, what times a user can be logged in, what communication channels are active, which network ports are open, what host can be connected to network sockets, and an analysis of kernel data structures to verify that the kernel data structures are not corrupted or infected by a virus (e.g., a root-kit). Specific data relating to a system state can include, but is not limited to, password names, names of allowed hosts, allowed or not allowed users, and allowed communication protocols.

The processing of non-persistent state information can include kernel state information, user state information, or any suitable combination thereof. The analysis of the kernel data structures can include validating kernel data structures have not been corrupted (e.g., by a root kit or a virus), verifying the absence of a virus, checking kernel data structures against a known set of signatures, or verifying the kernel is properly configured and has the required components installed. The analysis of the physical user state information can check for malware or whether programs being run conform to policy.

In one example illustration, consider malware that modifies kernel data structures. In particular, a root kit may hide itself and modify kernel data structures such that any threads associated with the root kit are hidden from tools typically used to view processes and threads on a system. If a root kit modifies a particular memory page such that the thread associated with that root kit cannot be seen by the typical viewing tools, then the modification can be identified by inspecting the physical memory pages of the virtual guest machine, and thus, threats can be detected.

Additional, and possibly more complex, types of memory inspections may also be implemented. For example, kernel data structures may be walked and decoded, walk lists could be used to help determine if kernel data structures have been corrupted, any appropriate checks may be performed on any data structures that can be decoded, comparisons may be made between a kernel run queue and threads displayed for a user (e.g., to detect when a thread associated with a root kit has been removed from a list of threads displayed to users, but remains in the kernel run queue), etc.

Processing systems that could benefit from embodiments of the present disclosure may include, but are not limited to, server farms, data centers, and processing clusters. Further, the embodiments for passively detecting threats may also be implemented in network elements or other networking equipment.

Security manager host 30 may be in communication with memory inspection engine 44 for providing a reaction mechanism to out of band or off-line detections made by memory inspection engine 44 of non-persistent state information (or persistent state information that is in memory) of virtual machine host 20. The terms 'out of band' and 'off-line' used herein are intended to describe activities occurring separately from a system (e.g., virtual machine host 20) being monitored for threats, where the off-line or out of band activities are processed by a different machine and processor than the system being monitored and may run concurrently with the system being monitored. If a threat (e.g., malware) is detected by memory inspection engine 44, feedback loop 4 may provide an appropriate communication (e.g., a message containing detected threat information or alert) to security manager host 30 regarding the threat detection.

In one embodiment, security manager host 30 may include services (e.g., a security software platform for virtual infrastructure) configured to manage virtualized components in network environment 10, including taking any appropriate remedial action on virtual machine host 20. For example, virtual machine host 20 could be shut down or quarantined, a guest machine that is associated with the inspected memory pages (e.g., memory page set V' 43a) can be shut down or quarantined while leaving other guest machines of virtual machine host 20 running, appropriate patches may be installed in virtual machine host 20, alerts may be sent to appropriate authorized persons in any suitable format (e.g., email message, report, screen notification, text message, etc.). Security manager host 30 may be implemented in any suitable network element or other computer, such as a server hosting a security software platform for virtual infrastructure.

It should be noted that computers such as virtual machine host 20, page synchronization host 40, and security manager host 30, and the communication interconnections shown and described herein are for illustrative purposes only. FIG. 1 is intended as an example and should not be construed to imply architectural limitations in the present disclosure, as numerous other network configurations can also accommodate the embodiments disclosed herein.

Figure 2:
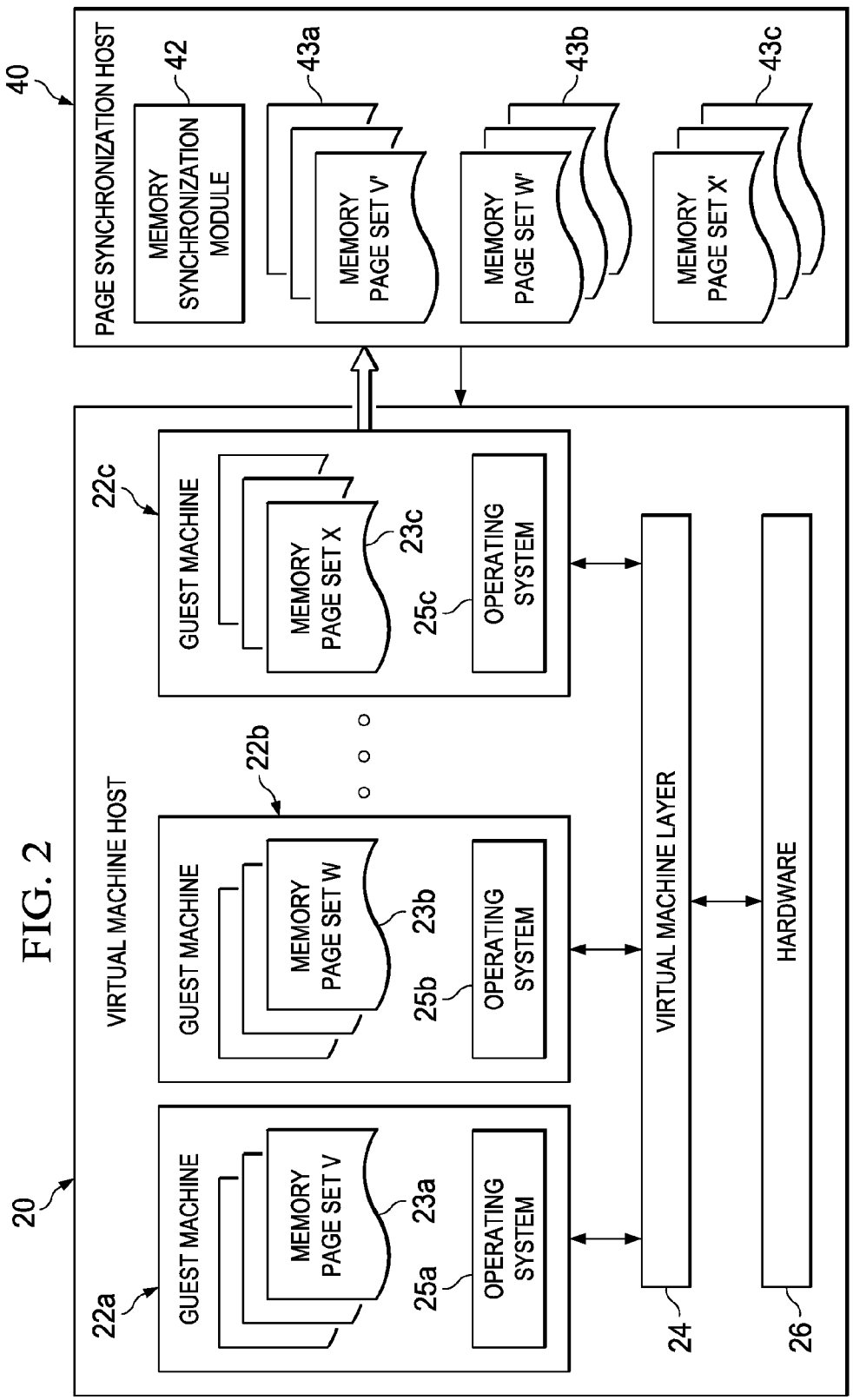
FIG. 2 is a simplified block diagram illustrating additional details that may be associated with example components in the network environment in accordance with the present disclosure.

Turning to FIG. 2, a block diagram shows additional details that may be associated with virtual machine host 20 and page synchronization host 40 of network environment 10 in accordance with example embodiments in the present disclosure. Virtual machine host 20 represents one example of a virtual machine host that may be passively monitored for threats in accordance with embodiments of the present disclosure. Virtual machine host 20 can be configured with hardware 26, a virtual machine layer 24 (or hypervisor), and one or more virtual guest machines 22a-c. In general, hardware 26 represents any machine or apparatus that is capable of accepting, performing logic operations on, storing, or displaying data, and may include without limitation a processor, a memory element, and network interfaces to interface with page synchronization host 40, security manager host 30 (shown in FIG. 1), and other network-based components. In one example, the processor could include a single core processor, a multi-core processor, a server blade having multiple processors, or a rack of server blades for example, within a data center providing distributed computational resources.

Virtual machine layer 24 may be a native or "bare metal" hypervisor that runs directly on hardware 26, but may alternatively run under host software executing on hardware 26. Virtual machine layer 24 can allow multiple operating systems 25a-c (i.e., kernels) to run concurrently in virtual machine host 20 and to share the same hardware 26 and its associated resources. Each guest operating system 25a-c runs in its own partitioned virtual guest machine 22a-c, respectively. Guest operating systems 25a-c may be different operating systems, the same operating systems, different versions/configurations of the same operating systems, or any appropriate combination thereof. While operating systems 25a-c run concurrently on hardware 26, virtual machine layer 24 can make it appear to each operating system 25a-c that it is the only operating system controlling hardware 26. Thus, hardware 26 can be shared by different operating systems 25a-c and the various applications installed to run on the different operating systems 25a-c.

Kernel state information and user state information for each guest machine 22a-c are provided in respective physical memory page sets (V, W, and X) 23a-c. Initially, synchronized memory page sets (V', W', and X') 43a-c can be created from memory page sets (V, W, and X) 23a-c, for example, by pushing each memory page set (V, W, and X) 23a-c to page synchronization host 40. By accessing virtual machine layer 24, memory synchronization module 42 can monitor which memory pages of memory page sets (V, W, and X) 23a-c of guest machines 22a-c have been modified since the last synchronization occurred. A 'synchronization interval' is referred to herein as a period of time after memory pages of a guest machine of a virtual machine host are synchronized, if needed, with memory pages of a different machine host such as page synchronization host 40 (e.g., if changes have been made to the memory pages of the guest machine since the previous synchronization). A synchronization interval can be a predetermined amount of time, which could be configured, for example, by memory synchronization module 42 or by an authorized user. When a synchronization interval expires, virtual machine layer 24 can be stopped or paused, during which time memory page sets (V, W, and X) 23a-c of guest machines 22a-c can be synchronized, if needed, with memory page sets (V', W', and X') 43a-c of page synchronization host 40. Synchronization may be achieved by copying any memory pages (e.g., subsets) of memory page sets (V, W, and/or X) 23a, 23b, and/or 23c that have been modified during the synchronization interval to respective memory page sets (V', W', and/or X') 43a, 43b, and/or 43c. If no memory pages on virtual guest machines 22a-c have been modified during the synchronization interval, then copying memory pages from virtual machine host 20 to page synchronization host 40 may be unnecessary. In one embodiment, only modified memory pages of virtual guest machines 22a-c are copied to page synchronization host 40, and, thus, processing of virtual machine layer 24 is paused or stopped for an insignificant amount of time to accomplish this (e.g., a fraction of a second).

Figure 3:
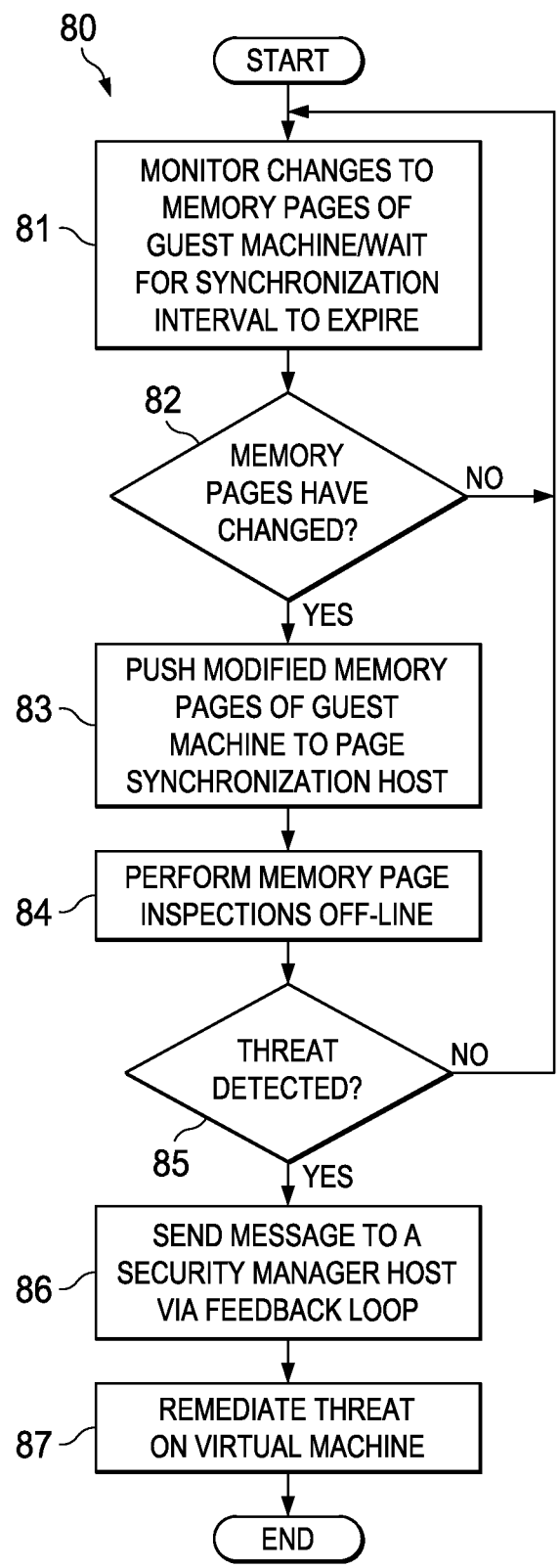
FIG. 3 is a simplified flowchart illustrating a series of example operational steps that may be associated with passively detecting a threat using virtual memory inspections in the network environment in accordance with the present disclosure.

FIG. 3 is a simplified flowchart 80 illustrating potential operations that may be associated with one embodiment of a system for passively detecting threats using virtual memory inspections in host environment 10. For ease of understanding and illustration purposes, reference will be made to virtual guest machine 22a and its associated components when describing operations of flowchart 80. However, operations of flowchart 80 may also be applied to multiple guest machines running concurrently in a single virtual machine host (e.g., guest machines 22a-c in virtual machine host 20).

Initially, memory page set V 23a of virtual guest machine 22a may be copied to memory page set V' 43a of page synchronization host 40. The flow of flowchart 80 illustrates continued monitoring of the memory pages of virtual guest machine 22a. Flow may begin at 81 where physical memory pages of memory page set V 23a of virtual guest machine 22a are monitored for changes. After a synchronization interval has expired, a determination is made as to whether any of the physical memory pages of memory page set V 23a (e.g., a subset of memory page set V 23a) have been modified. If no changes have occurred in any memory page of memory page set V 23a, then memory pages may continue to be monitored at 81 during another synchronization interval.

If it is determined at 82 that any or all memory pages of memory page set V 23a have been modified, then the modified pages of memory page set V 23a are pushed to page synchronization host 40 to synchronize memory page set V' 43a with memory page set V 23a. For example, if a subset of memory page set V 23a of virtual guest machine 22a was changed during the synchronization interval, then the subset of memory page set V 23a may be copied to page synchronization host 40 to update memory page set V' 43a (i.e., synchronizing memory page set V' 43a with memory page set V 23a).

After memory page set V' 43a has been synchronized with memory page set V 23a, memory inspections may be performed off-line at 84 on memory page set V' 43a by memory inspection engine 44. Various techniques may be used to inspect both kernel state information and user state information in order to detect threats. For example, as previously discussed herein, off-line inspections could include interpreting kernel data structures, checking kernel data structures against a known set of signatures to identify malware or other threats, and verifying the kernel is properly configured and has the required components installed. Off-line memory inspections of user state information could include searching for indications of malware and determining whether programs being run conform to policy.

At 85, a determination is made as to whether a threat has been detected based on the off-line inspections of memory page set V' 43a. If no threats have been detected, then memory pages of virtual guest machine 22a are monitored until another synchronization interval expires. Alternatively, if one or more threats are detected, as determined at 85, then at 86 a message (or other appropriate communication) may be sent to security manager host 30 via feedback loop 4. Because the memory inspections are performed off-line, virtual machine 22a may continue processing until it receives suitable commands having sufficient authorization to remediate any detected threats.

In one embodiment, security manager host 30 may include security services for the virtual infrastructure of network environment 10 and may be configured to remediate virtual machine host 20 based on particular needs and policies of host environment 10. For example, certain malware detected in memory page set V' 43a may be remediated by shutting down guest machine 22a. Other identified malware, for example, with known propagation vectors, may be remediated by shutting down virtual machine host 20, including all virtual machines 22a-c. In another example, a detected threat of a program not conforming to policy may be remediated by simply sending an alert to an administrator, depending on the particular policy being violated. The enumerated remediation techniques are for illustration purposes only and are not intended to limit the broad scope of this disclosure. Any appropriate remediation techniques may be applied based on particular needs, preferences, and implementations of a network environment.

If remediation at 87 does not include shutting down guest machine 22a, then memory pages of virtual guest machine 22a may continue to be monitored until another synchronization interval expires. In addition, in a scenario in which virtual machine host 20 has multiple guest machines 22a-c, if remediation does not include shutting down virtual machine host 20 entirely (e.g., if one or more guest machines 22a-c continue processing) then memory pages of all active guest machines 22a, 22b, and/or 22c could continue to be monitored until another synchronization interval expires.

Software for achieving the operations outlined herein can be provided at various locations (e.g., the corporate IT headquarters, end user computers, network elements and in a network such as a LAN, distributed servers in the cloud, gateways, scanners, mobile and portable devices, etc.). In some embodiments, this software could be received or downloaded from a web server (e.g., in the context of purchasing individual end-user licenses for separate networks, devices, servers, etc.) in order to provide a system for passively detecting threats using virtual memory inspection. In one example implementation, this software is resident in one or more computers or network elements sought to be protected from a security attack (or protected from unwanted or unauthorized manipulations of data).

In example embodiments, the software for detecting threats using virtual memory inspections could involve a proprietary element (e.g., as part of a network security solution with McAfee® software security products), which could be provided in (or be proximate to) the identified components, or be provided in any other device, server, network appliance, console, firewall, switch, information technology (IT) device, distributed server, etc., or be provided as a complementary solution (e.g., in conjunction with a firewall), or provisioned somewhere in the network.

In certain example implementations, the passive threat detection activities outlined herein may be implemented in software provided in memory synchronization module 42 and memory inspection engine 44 of page synchronization host 40 and in other network elements and computers. These components and modules are shown as examples of software to perform threat detection activities. In certain embodiments, memory synchronization module 42 and memory inspection engine 44 in page synchronization host 40 may cooperate with other security solutions in order to perform threat detection activities as discussed herein. In some embodiments, these features may be provided external to these components, included in other devices to achieve these intended functionalities, or consolidated in any appropriate manner. For example, some of the processors associated with the various components may be removed, or otherwise consolidated such that a single processor and a single memory location are responsible for certain activities. In a general sense, the arrangement depicted in FIG. 1 may be more logical in its representation, whereas a physical architecture may include various permutations/combinations/hybrids of these elements.

Note that with the examples provided herein, interaction may be described in terms of two, three, four, or more network components. However, this has been done for purposes of clarity and example only. It should be appreciated that the system can be consolidated in any suitable manner. Along similar design alternatives, any of the illustrated computers, modules, memory elements, and components of the FIGS. 1-2 may be combined in various possible configurations, all of which are clearly within the broad scope of this Specification. For example, memory page sets (V', W', and X') 43a-c of page synchronization host 40 may alternatively be stored in another virtual machine on a different host or in any other suitable memory element separate from page synchronization host 40. In another example, memory inspection engine 44 may be provided in another network element and may have suitable access to memory page sets (V', W', and X') 43a-c for performing memory inspections. In certain cases, it may be easier to describe one or more of the functionalities of a given set of flows by only referencing a limited number of components or network elements. Therefore, it should also be appreciated that the system of FIG. 1 (and its teachings) is readily scalable. The system can accommodate a large number of components, as well as more complicated or sophisticated arrangements and configurations. Accordingly, the examples provided should not limit the scope or inhibit the broad teachings of the system as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method, comprising:
    synchronizing a first memory page set of a first host with a second memory page set of a virtual guest machine of a second host to capture a current state of the virtual guest machine, wherein the synchronizing is to cause kernel state information and user state information of one or more physical memory pages of the virtual guest machine to be stored in the first memory page set;
    capturing a new current state of the virtual guest machine by updating the first memory page set with a subset of the second memory page set at an expiration of a predetermined synchronization interval if monitoring the second memory page set indicates the subset of the second memory page set includes at least one physical memory page modified during the predetermined synchronization interval;
    evaluating the new current state of the virtual guest machine by inspecting the updated first memory page set off-line;
    detecting a threat in the updated first memory page set based on the inspecting of at least one of the kernel state information and the user state information in the updated first memory page set; and
    taking an action based on the threat.

2. The method of claim 1, wherein, after being updated with the subset of the second memory page set, the first memory page set is at least substantially the same as the second memory page set existing when the previous synchronization interval expired.

3. The method of claim 1, wherein the inspecting the first memory page set includes analyzing a portion of the first memory page set corresponding to the subset of the second memory page set.

4. The method of claim 1, wherein the second memory page set of the virtual guest machine represents non-persistent memory of the virtual guest machine.

5. The method of claim 1, wherein the action includes sending a communication via a feedback loop to a security manager.

6. The method of claim 1, wherein the inspecting the first memory page set includes analyzing at least one of kernel data structures and user data structures.

7. The method of claim 1, wherein the action is based on a policy.

8. The method of claim 1, wherein the action includes at least one of shutting down the virtual guest machine and alerting an administrator.

9. One or more non-transitory media that includes code for execution and when executed by a processor is operable to perform operations comprising:
    synchronizing a first memory page set of a first host with a second memory page set of a virtual guest machine of a second host to capture a current state of the virtual guest machine, wherein the synchronizing is to cause kernel state information and user state information of one or more physical memory pages of the virtual guest machine to be stored in the first memory page set;
    capturing a new current state of the virtual guest machine by updating the first memory page set with a subset of the second memory page set at an expiration of a predetermined synchronization interval if monitoring the second memory page set indicates the subset of the second memory page set includes at least one physical memory page modified during the predetermined synchronization interval;
    evaluating the new current state of the virtual guest machine by inspecting the updated first memory page set off-line;
    detecting a threat in the updated first memory page set based on the inspecting of at least one of the kernel state information and the user state information in the updated first memory page set; and
    taking an action based on the threat.

10. The one or more non-transitory media of claim 9, wherein, after being updated with the subset of the second memory page set, the first memory page set is at least substantially the same as the second memory page set existing when the previous synchronization interval expired.

11. The one or more non-transitory media of claim 9, wherein the second memory page set of the virtual guest machine represents non-persistent memory of the virtual guest machine.

12. The one or more non-transitory media of claim 9, wherein the inspecting the first memory page set is to analyze at least one of kernel data structures and user data structures.

13. An apparatus, comprising:
a memory synchronization module;
a memory inspection engine;
a memory element for storing a first memory page set; and
a processor operable to execute operations associated with the first memory page set, wherein the memory synchronization module, the memory inspection engine, the first memory page set, and the processor cooperate such that the apparatus is configured for:
synchronizing the first memory page set with a second memory page set of a virtual guest machine of a host to capture a current state of the virtual guest machine, wherein the synchronizing is to cause kernel state information and user state information of one or more physical memory pages of the virtual guest machine to be stored in the first memory page set;
capturing a new current state of the virtual guest machine by updating the first memory page set with a subset of the second memory page set at an expiration of a predetermined synchronization interval if monitoring the second memory page set indicates the subset of the second memory page set includes at least one physical memory page modified during the predetermined synchronization interval;
evaluating the new current state of the virtual guest machine by inspecting the updated first memory page set off-line;
detecting a threat in the updated first memory page set based on the inspecting of at least one of the kernel state information and the user state information in the updated first memory page set; and
taking an action based on the threat.

14. The apparatus of claim 13, wherein, after being updated with the subset of the second memory page set, the first memory page set is at least substantially the same as the second memory page set existing when the previous synchronization interval expired.

15. The apparatus of claim 13, wherein the second memory page set of the virtual guest machine represents non-persistent memory of the virtual guest machine.

16. The apparatus of claim 13, wherein the action includes sending a communication via a feedback loop to a security manager.

17. The apparatus of claim 13, wherein the action is based on a policy and includes at least one of shutting down the virtual guest machine and alerting an administrator.

18. The one or more non-transitory media of claim 9, wherein the inspecting the first memory page set is to analyze a portion of the first memory page set corresponding to the subset of the second memory page set.

19. The one or more non-transitory media of claim 9, wherein the action is based on a policy.

20. The one or more non-transitory media of claim 9, wherein the action is to perform at least one of shutting down the virtual guest machine and alerting an administrator.

* * * * *